Patented Feb. 11, 1947

2,415,453

UNITED STATES PATENT OFFICE 2,415,453

SYNTHESIS OF BICYCLO-OLEFINIC COMPOUNDS

Charles L. Thomas, Riverside, Ill., assignor to Universal Oil Products Company, Chicago, Ill., a corporation of Delaware No Drawing. Application January 10, 1944, Serial No. 517,703

5 Claims. (Cl. 260—648)

This application is a continuation-in-part of my co-pending application Serial No. 466,940, filed November 25, 1942, now Patent No. 2,340,908, issued February 8, 1944.

This invention is concerned with the synthesis of a particular type of organic compounds which may be regarded as substituted bicycloalkenes or bicycloalkene derivatives.

Such substituted bicycloalkenes which I may synthesize by my process comprise bicycloalkenes and alkylbicycloalkenes in which a hydrogen atom combined with one of the carbon atoms in a bicycloalkene ring is substituted by a group, such as carbinol, halide, nitrile, nitro, amine, organic acid, aldehyde, ketone, etc.

An object of my invention is to synthesize mono-olefinic bicyclic alcohols, halides, esters, aldehydes, nitriles, ethers, ketones, etc., by reacting dicyclopentadiene with a mono-olefinic alcohol, halide, ester, aldehyde, ketone, nitriles, ethers, etc.

In one specific embodiment the present invention relates to a process for producing substituted bicycloalkenes which comprises interacting dicyclopentadiene and a mono-olefinic compound selected from the group consisting of alkenyl halides, alkenyl cyanides, and alkenyl ethers.

According to the process of my invention, a substituted bicyclo-alkene is prepared by reacting dicyclopentadiene and a mono-olefinic compound corresponding to the type formula:

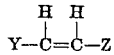

wherein Y indicates a member selected from the group of substituents consisting of hydrogen, alkyl, aryl, and aralkyl; and Z represents a member selected from the functional groups consisting of halide, carbinol, nitrile, nitro, amine, amide, carboxylic acid, aldehyde, ketone, ester, and ether.

More particularly, my process relates to interacting dicyclopentadiene with an alkenyl compound which is represented by the general formula, RX, wherein R indicates an alkenyl radical, and X is a member selected from the group consisting of halogen, cyanide, and alkoxyl. By the term, "alkenyl radical," I mean a mono-olefinic group, such as vinyl, allyl, methallyl, etc. The alkenyl halides, which may also be referred to as mono-halo-olefins or mono-halo-alkenes, include vinyl halides, allyl halides, methallyl halides, etc., and particularly vinyl chloride, allyl chloride, methallyl chloride, etc. Alkenyl cyanides may also be referred to as monocyano alkenes and include the unsaturated nitriles, such as acrylonitrile, methacrylonitrile, etc. Alkenyl ethers include alkylalkenyl and dialkenyl ethers.

Other mono-olefinic compounds corresponding to the type formula given above include olefinic alcohols and olefinic amines, which may also be referred to as alkenols and alkene amines, respectively.

A few reactions typical of those occurring in accordance with the present invention are illustrated below by equations in which the generally accepted structural formula is used for each of the compounds involved.

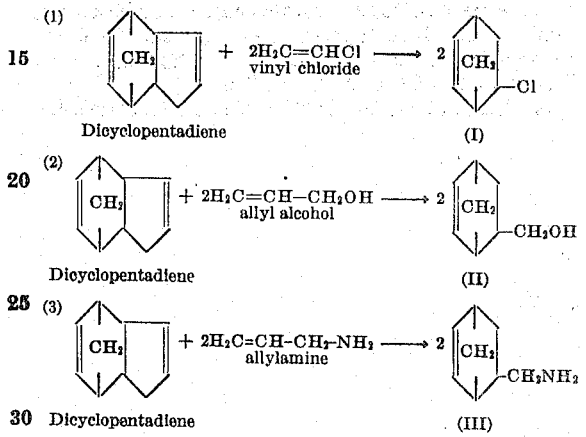

In accordance with the process of this invention, dicyclopentadiene is reacted with different mono-olefinic compounds as hereinabove set forth to form substituted bicycloalkenes or bicycloalkene derivatives, some of which are illustrated as products in the above-indicated equations. Other mono-olefinic compounds will react similarly to yield a number of substituted bicycloalkenes having different substituent groups.

The reactions of the present process may be brought about under particular thermal conditions or they may be carried out in the presence of catalysts. Ordinarily, weighed amounts of dicyclopentadiene and a mono-olefinic compound are charged to a reactor such as an autoclave and heated to a temperature of from about 100° to about 400° C., but preferably of from about 150° to about 300° C. in order to bring about a condensation reaction to form desired substituted bicycloalkenes. Superatmospheric pressure may be employed whenever it is needed or whenever desired to maintain the necessary concentration of a reactant. The pressure developed during the reaction period may be as high as 200 atmospheres or more. The preferred temperature and pressure and molar ratio of reactants employed will vary with the type of mono-olefinic compound which is reacted with dicyclopentadiene.

Continuous operations may be carried out by passing a mixture of dicyclopentadiene and a mono-olefinic compound through a heated reaction zone maintained at a temperature of from about 100° to about 400° C. and at a pressure generally from about 25 to about 200 atmospheres. Under these conditions the charging rates of reactants are generally from about 0.1 to about 10 volumes of liquid per hour per volume of reactor space.

The following example is given as typical of the reactions and products of the present invention, although it is not intended to limit the invention in exact correspondence thereto.

50 parts by weight of dicyclopentadiene and 50 parts by weight of vinyl chloride are reacted in a steel autoclave at 200° C. for 10 hours. The reaction product contains 45 parts by weight of dehydronorbornyl chloride, which is indicated hereinabove as Compound I.

The novelty and utility of the process of the present invention are evident from the preceding specification and example, although neither section is intended to limit unduly its broad scope.

I claim as my invention:

1. A process for manufacturing a bicycloalkene halide which comprises heating dicyclopentadiene and an alkenyl halide at a temperature of from about 100° C. to about 400° C.

2. A process for manufacturing a bicycloalkene halide which comprises heating dicyclopentadiene and a vinyl halide at a temperature of from about 150° C. to about 300° C.

3. The process of claim 1 further characterized in that said alkenyl halide comprises vinyl chloride.

4. A process for manufacturing a bicycloalkene halide which comprises heating dicyclopentadiene and a vinyl halide at a temperature of from about 100° C. to about 400° C.

5. A process for the production of dehydronorbornyl chloride which comprises heating dicyclopentadiene and vinyl chloride at a temperature of about 200° C.

CHARLES L. THOMAS.

REFERENCES CITED

The following references are of record in the file of this patent:

UNITED STATES PATENTS

| Number | Name | Date |
|---|---|---|
| 2,336,208 | Alder, et al. | Dec. 7, 1943 |
| 2,262,002 | Hopff, et al. | Nov. 11, 1941 |
| 2,280,058 | Bruson | Apr. 21, 1940 |
| 2,301,518 | Bruson | Nov. 10, 1942 |

FOREIGN PATENTS

| Number | Country | Date |
|---|---|---|
| 663,564 | French | Dec. 15, 1930 |
| 457,621 | British | June 17, 1936 |

OTHER REFERENCES

Ralston, et al. Ind. and Eng. Chem., vol. 32, pp. 99–101 (1940).

Khambata, et al. J. Chem. Soc. London, pp. 375–81, vol. 1939.

Schultze. Chem. Abst., vol. 32, col. 8741.

Harkness, et al. J. Chem. Phys., vol. 5, pp. 682–94 (copies in Scientific Lib.).